United States Patent
Eroglu et al.

(10) Patent No.: US 6,558,154 B2
(45) Date of Patent: May 6, 2003

(54) BURNER SYSTEM WITH STAGED FUEL INJECTION AND METHOD FOR ITS OPERATION

(75) Inventors: Adnan Eroglu, Untersiggenthal (CH); Peter Stuber, Zurich (CH); Christian Oliver Paschereit, Baden (CH); Hans Peter Knoepfel, Dottikon (CH)

(73) Assignee: Alstom (Switzerland) Ltd, Baden (CH)

( * ) Notice: Subject to any disclaimer, the term of this patent is extended or adjusted under 35 U.S.C. 154(b) by 0 days.

(21) Appl. No.: 09/987,128

(22) Filed: Nov. 13, 2001

(65) Prior Publication Data

US 2002/0142257 A1 Oct. 3, 2002

(30) Foreign Application Priority Data

Nov. 13, 2000 (DE) .......................... 100 56 124

(51) Int. Cl.[7] .................................. F23C 5/00
(52) U.S. Cl. .................... 431/8; 431/75; 431/351; 431/354; 60/737; 60/748
(58) Field of Search .................... 431/1, 8, 10, 75, 431/173, 284, 350–354, 347; 60/737, 748, 743, 733

(56) References Cited

U.S. PATENT DOCUMENTS

| | | | |
|---|---|---|---|
| 4,735,052 A | | 4/1988 | Maeda et al. |
| 5,375,995 A | * | 12/1994 | Dobbeling et al. ......... 431/354 |
| 5,605,452 A | | 2/1997 | Robertson et al. |
| 5,791,889 A | * | 8/1998 | Gemmen et al. .............. 431/1 |
| 6,003,299 A | | 12/1999 | Idleman |

FOREIGN PATENT DOCUMENTS

| | | |
|---|---|---|
| DE | 4040745 A1 | 7/1991 |
| DE | 4339094 A1 | 5/1995 |
| DE | 4446842 A1 | 7/1996 |
| DE | 4446945 A1 | 7/1996 |
| DE | 19636093 A1 | 3/1998 |
| EP | 0321809 B1 | 5/1991 |
| EP | 0780629 A2 | 6/1997 |
| EP | 0881373 A2 | 12/1998 |
| EP | 0962704 A2 | 12/1999 |
| EP | 0985810 A1 | 3/2000 |
| GB | 2306216 A | 4/1997 |
| WO | 93/17279 | 9/1993 |

* cited by examiner

Primary Examiner—James C. Yeung
(74) Attorney, Agent, or Firm—Burns, Doane, Swecker & Mathis, L.L.P.

(57) ABSTRACT

A burner system with staged fuel injection includes a burner with a swirl generator (1) for a combustion air stream and device(s) for introducing fuel into the combustion air stream, wherein the fuel introducing devices include at least two separate fuel supply elements (4a, 4b) with groups of fuel outlet openings for corresponding premix fuel amounts, wherein a first group is arranged downstream from a second group. The burner system furthermore includes measurement value probes (8, 9) for measuring the pulsations and emissions of the combustion, as well as a control device (10) that controls the two stages (4a, 4b) for introducing fuel dependent on the measured measuring values. The burner system permits optimized operation of the system even under changing operating and environmental conditions.

14 Claims, 2 Drawing Sheets

BURNER SYSTEM WITH STAGED FUEL INJECTION AND METHOD FOR ITS OPERATION

FIELD OF THE INVENTION

The invention at hand relates to a burner system with staged fuel injection as well as an operating method associated with it. The burner system includes a burner with a swirl generator for a combustion air stream and means for introducing fuel into the combustion air stream, whereby the means for introducing fuel into the combustion air stream includes at least one first fuel supply means with a first group of fuel outlet openings for a first premix fuel amount and a second fuel supply means with a second group of fuel outlet openings downstream from the first group of fuel outlet openings for a second premix fuel amount. A preferred field of application for such a burner system is the gas and steam turbine technology.

BACKGROUND OF THE INVENTION

EP 0 321 809 B1 discloses a conical burner having several shells, a so-called double-cone burner. The conical swirl generator composed of several shells produces a closed swirl flow in the cone head, which, based on the increasing swirl, becomes instable along the cone tip and changes into an annular swirl flow with backflow in the core. The shells of the swirl generator are configured in such a way that tangential air inlet slits for the combustion air are formed along the burner axis. Along the cone shells' inflow edge created by this, supply means for the premix gas, i.e., the gaseous fuel, are provided, which have outlet openings for the premix gas distributed in the direction of the burner axis. The gas is injected transversely to the air inlet slit through the outlet openings or holes. In connection with the swirl of the combustion air/combustion gas flow generated in the swirl chamber, this injection results in a good mixing of the combustion or premix gas with the combustion air. In such premix burners, a good mixing is the prerequisite for low $NO_x$ values during the combustion process.

In order to further improve on such a burner, EP 0 780 629 A2 discloses a burner for a heat generator provided after the swirl generator with an additional mixing section for mixing fuel and combustion air. This mixing section, for example, could be realized as a subsequent pipe, into which the flow exiting the swirl generator is guided without any significant flow losses. This additional mixing section makes it possible to further increase the mixing efficiency and therefore to reduce noxious emissions.

FIG. 1 schematically shows an example for such burners, in which the fuel is mixed with the inflowing combustion air via outlet openings in supply channels arranged along the burner axis in the swirl body 1. The figure hereby shows the conical swirl body 1 of the burner, on or in which the fuel supply means with outlet openings 2 arranged along the burner axis—shown in the figure by arrows symbolizing the injected fuel—extend. These fuel supply means usually are constructed as single channels with a fixed distribution of the fuel outlet openings 2 along the burner axis. The figure also shows a pilot lance 3, through which the fuel is injected directly into the swirl chamber during the start-up of the burner. With an increasing load, a switchover from this pilot stage to the premix operation occurs, in which the fuel is mixed via the mentioned fuel outlet openings 2 with the inflowing combustion air.

Another known burner geometry of a premix burner is known from WO 93/17279. This arrangement uses a cylindrical swirl generator with an additional, conical internal body. The premix gas is also injected via supply means with corresponding outlet openings into the swirl chamber, the outlet openings being arranged along the axially extending air inlet slits. The pilot supply means of this burner is provided at the end of the conical internal body. The pilot operation results in increased $NO_x$ emissions, however, since this type of operation only allows an insufficient mixing with the combustion air.

All known burner systems are designed with a single-stage supply of the fuel during premix operation. Size, distribution, arrangement, spacing, as well number of the outlet openings of the fuel supply means along the burner axis must be optimized in order to fulfill the requirements regarding low emissions, extinction limit, backflash limit, as well as requirements for combustion stability. It is hereby almost impossible to also fulfill all of these requirements with a fixed distribution of the outlet openings under changing operating and environmental conditions. The characteristic of injection with respect to penetration depth and mixing-in of the gas jets as well as the fuel distribution along the air inlet slits or burner axis are established by the selection of the aforementioned parameters. A distribution of the outlet openings that are optimized for a particular type of system, for example with a ring combustion chamber, is no longer optimized for another type of system, for example one with a silo combustion chamber. Furthermore, the operating conditions of a system change over time, for example because leakage currents increase as a result of aging effects. A fixed distribution of the outlet openings is unable to compensate for such aging effects.

Another advantage of the known methods for operating premix burners is that they are optimized for low emissions and low combustion oscillations under full load conditions. An additional pilot stage is necessary for starting up the burner and gas turbine. At a certain operating load, at which the combustion can be maintained in premix operation, the burner is switched from the pilot to the premix stage. In the same manner, the shutting down of the gas turbine requires a switchover from premix operation to pilot operation. However, these switching processes cause strong combustion oscillations as well as large load oscillations. They furthermore require large amounts of an inert gas in order to flush the fuel supply means that are no longer in operation after the switchover. This is necessary in order to avoid an ignition of the unused fuel supply means through circulating hot gases.

Switchover processes from liquid to gaseous fuel, or vice versa, are also difficult to realize using existing fuel injection techniques because of the proximity of the injection nozzles to the inlet openings of the pilot system.

An aspect of the invention is a burner system as well as a method for operating a burner that do not have the above disadvantages and also permit optimized operation with changing operating and environmental conditions.

SUMMARY OF THE INVENTION

The burner system according to the invention includes a burner with a swirl generator for a combustion air stream and means for introducing fuel into the combustion air stream, whereby the means for introducing fuel into the combustion air stream includes at least one first fuel supply means with a first group of fuel outlet openings for a first premix fuel amount (first stage) and a second fuel supply means with a second group of fuel outlet openings (second stage) downstream from the first group of fuel outlet openings for a second premix fuel amount. Naturally, further groups of fuel outlet openings for further premix fuel amounts can be provided independently from the first and second group. Furthermore, several first and second fuel supply means for the respective stage are usually distributed with their outlet openings over the circumference of the swirl body, as is known already from the single-phased systems. The burner system also comprises a first measuring value probe that measures pulsations of a combustion initiated by the burner, and/or a second measuring value probe that measures the emission values of the combustion. The measuring value probes are connected to a control device that receives the measuring data from the measuring value probe(s) and controls the fuel supply by way of the first and second fuel supply means—as well as, if applicable, other fuel supply means—dependent on the measuring data provided by the measuring value probe(s). The control therefore adheres to the desired specifications. Naturally, more than one measuring value probe can be used to measure the pulsations and/or emission values.

In the simplest case of such a burner system, all or several of the fuel supply means arranged at the swirl body, in the case of single-stage systems, are divided into at least two independent channels for the fuel in order to form the different stages. Naturally, several juxtaposed fuel supply means can be provided, in which the outlet openings are offset from each other along the longitudinal axis in such a way as to form the separate stages. The skilled artisan will recognize many ways available for providing different groups of outlet openings on the swirl body along the burner axis, where said groups can be supplied with fuel independently from each other. The fuel supply to the individual stages is controlled or regulated via the control device according to the aforementioned specifications, dependent on the pulsations and/or emission values. Preferably, this is accomplished with control valves provided in the supply lines to the first and second fuel supply means.

Suitable measuring value probes that can be provided in the flame region—in order to measure the pulsations—or at the outlet of the burner—in order to measure the emission values—are known to the expert. Numerous sensors for measuring the emissions and, as a rule, acoustic sensors for measuring the pulsations, are available for this purpose.

The control of the fuel supply means by way of the control device is performed preferably by means of comparative data stored in a memory of the control device. The control device compares the measured data with the control data in order to be able to determine the current operating point of the burner system and control the fuel supply in towards the desired operating point.

Compared with single-stage burner systems, the use of a burner system with staged fuel injection permits a clearly expanded operating range. With a suitable arrangement of the supply lines to the fuel supply means of the individual stages, this does not require any additional, separate fuel cycle. The independent controllability of the at least two stages of the burner system in connection with the control device permit an operation with low pulsations from ignition to basic load as well as low $NO_x$ emissions. No pilot stage is required for this burner system, so that also no switchover processes with the associated pulsations or load oscillations occur. The operation of the burner system does not require flushing with inert gases, such as, for example, $N_2$. This at the same time reduces the operating costs of the system. The absence of the pilot stage also makes it possible to realize a simpler switchover from fuel oil to fuel gas operation and vice versa.

A special advantage of the burner system of the present invention is the dynamic controllability via the control device, whereby an optimum operating point can be realized for every type of system, every environmental condition, every age, and every degree of leakage. In particular, this operating point can be continuously adapted dependant on the mentioned parameters during operation of the system. The burner system as well as the associated operating method therefore permits optimum operation of the system under changing operating and environmental conditions.

In a preferred embodiment of the present burner system, the supply line to the fuel supply means of the second stage branches off the first stage—or vice versa. In this case, the burner system only can be controlled by controlling a control valve that influences the distribution of the fuel amount to the two fuel supply means. With a specified total fuel supply, this means that the distribution between the two stages is controlled via this valve. The control device hereby is connected only with this valve.

In the preferred type of operation of the present burner system, the fuel supply to the first and second stage is controlled in such a way as to minimize the pulsations and emission values. The control is preferably accomplished by a comparison with control data stored in the control device that were determined during prior testing and that show a dependence between the pulsations and emission values and the fuel supply to the first and second stage or the fuel distribution between the first and second stage. Here also it is naturally possible to operate more than two stages in the same manner.

A very good operating behavior is found when, during stationary operation, the fuel supply is controlled in such a way that the operating point is below the maximum of the pulsations—dependant on the fuel supply to the first stage—and in the case of a transient operation is above the maximum of the pulsations.

Although the present patent application does not give a detailed description of the exact size of the outlet openings, their arrangement, their spacing, and their distribution, the skilled artisan will not have a problem in finding suitable geometries and distributions. This may be accomplished simply by realizing the outlet openings provided in existing single-stage burners on the swirl body along the burner axis also in the same way for the present burner system, whereby the fuel supply means channel hereby must only be divided into parts that form the first and second stage. The skilled artisan will be aware of possibilities for optimizing or adapting the distribution of the outlet openings from single-stage burners.

BRIEF DESCRIPTION OF THE DRAWINGS

The present invention shall briefly be described below again with the help of exemplary embodiments in reference to the drawings without restricting the general concept of the invention, in which.

DETAILED DESCRIPTION OF THE PREFERRED EMBODIMENTS

Figure 1:
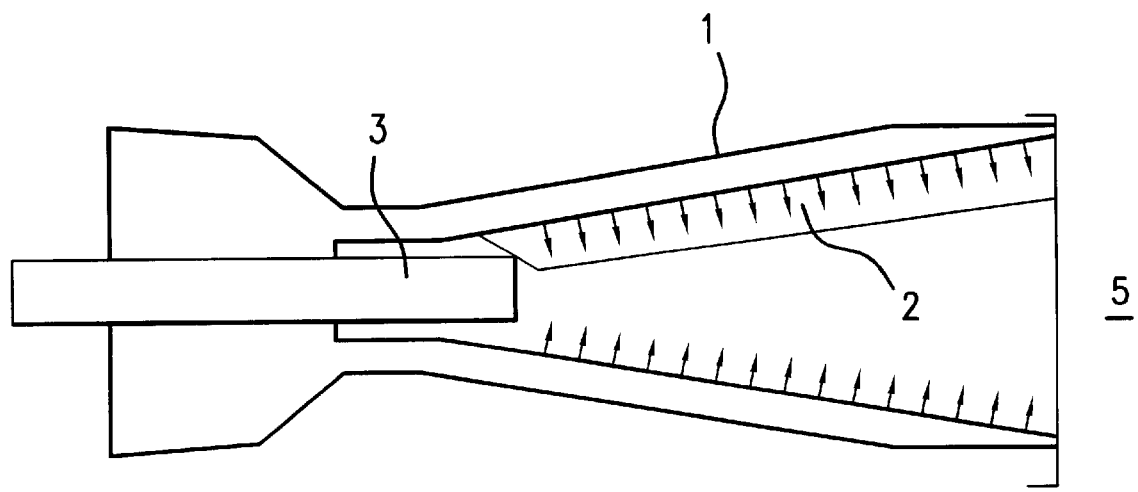
FIG. 1 shows a single-stage burner system according to the state of the art.
Figure 2:
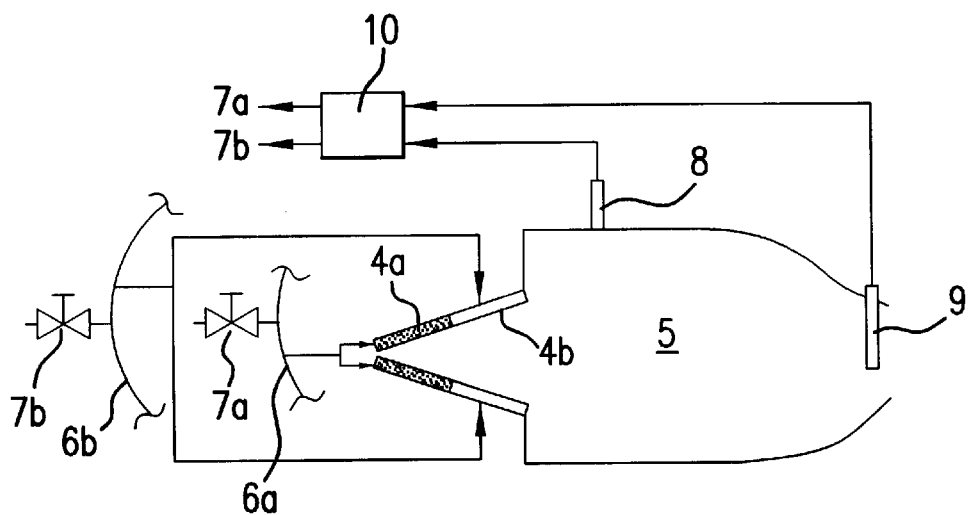
FIG. 2 shows a schematic illustration of a burner system according to the invention.

FIG. 1 shows a single-stage burner system as known from the state of the art, which has already been explained in the introductory part of the specification. Compared to this system, the present invention uses an at least two-stage burner system, as FIG. 2 shows schematically. Like the fuel supply means 4a and 4b on or in this swirl body 1, the conical swirl body 1 of this burner system also is shown only very schematically. This figure shows the two stages formed by the separate fuel supply means 4a and 4b with the corresponding outlet openings (not shown). In each case, a notable characteristic of this burner system, i.e., the two separate stages along the longitudinal axis of the burner, can be seen. The burner is followed by the combustion chamber 5 in which the fuel/combustion air mixture produced by the premixing is burned. The fuel is hereby supplied to the first stage 4a via fuel distribution system 6a. The fuel supply is hereby adjusted via a control valve 7a. In the same way, the second stage 4b is supplied with fuel via another fuel distribution system 6b with a control valve 7b. Both fuel distribution systems in this example are provided separately from each other. In order to measure the combustion pulsations, a pulsation sensor 8 that reports the measuring values regarding the intensity of the pulsations to the control device 10 is provided on the combustion chamber 5. Furthermore, a sensor 9 for the emission values that also transmits its data to the control device 10 is provided in the region of the combustion chamber outlet. In the control device 10, the measured data are compared with control data, and the two control valves 7a and 7b are controlled with respect to emission values and pulsations so as to maintain or achieve a specified operating point.

In an advantageous embodiment, in which, for example, the first fuel distribution system 6a directly branches off the second fuel distribution system 6b, the control device 10 also may be used only for controlling or regulating the control valve 7a, if the latter is provided directly at the branching-off point. By controlling the valve 7a, the fuel distribution to both stages then can be influenced in the presence of a total fuel supply determined by the control valve 7b. This simplified technique in the same manner also enables an optimized operation of the system under different operating and environmental conditions. In particular, such an embodiment does not require a separate fuel supply system for the first stage. Existing systems can be easily retrofitted using a suitable branch-off. In addition, this internal valve 7a can be controlled in such a way that a minimal fuel flow through the second stage exists at any time for any operating load, so that no flushing with inert gases is necessary. The overall control technology is simplified by the fact that only one valve can be controlled.

Figure 3:
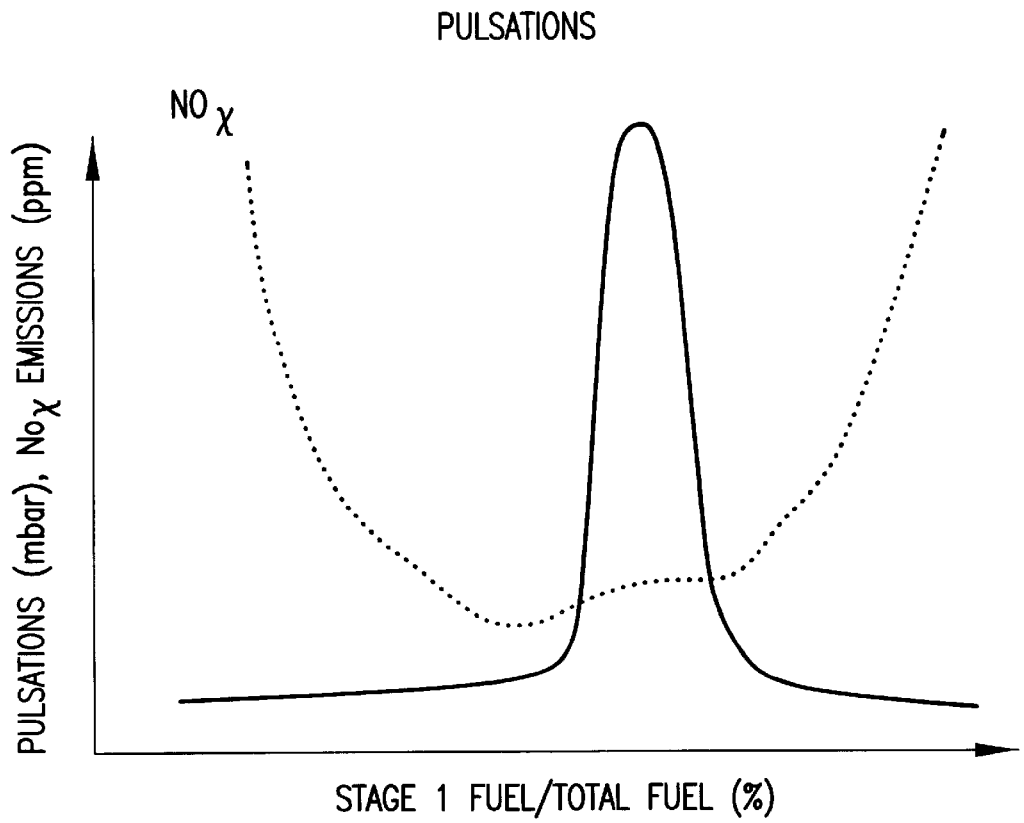
FIG. 3 shows an example of a dependence of the pulsations and emission values of a burner system according to the invention on the fuel supply to the first stage.

FIG. 3 shows an example of pulsations and emission values of a burner system according to the invention as a function of the fuel portion supplied to the first stage in relation to the overall fuel supply. This on the one hand shows a minimum of $NO_x$ emissions, which also contains, however, a maximum of pulsations. Such a relationship can be established by means of prior testing. The data for these relationships, e.g., a graph, preferably are stored in the control device 10 or are programmed into it. The programmed data are used by the control device 10 during operation as a basis for deciding which fuel amounts should be supplied to the different stages in order to maintain or achieve low emissions with low pulsations.

The data obtained by the measuring value probes 8, 9 preferably are compared with the stored control values by the control device's logic in order to bring the operating point of the burner system to the left or right side of the pulsation peak shown in FIG. 3. During stationary operation, the left side is preferred for this because of the low emission values. During transient operation, where emission considerations have a lower priority than a robust dynamic behavior of the burner, the right side of the pulsation peak is preferred.

Figure 4:
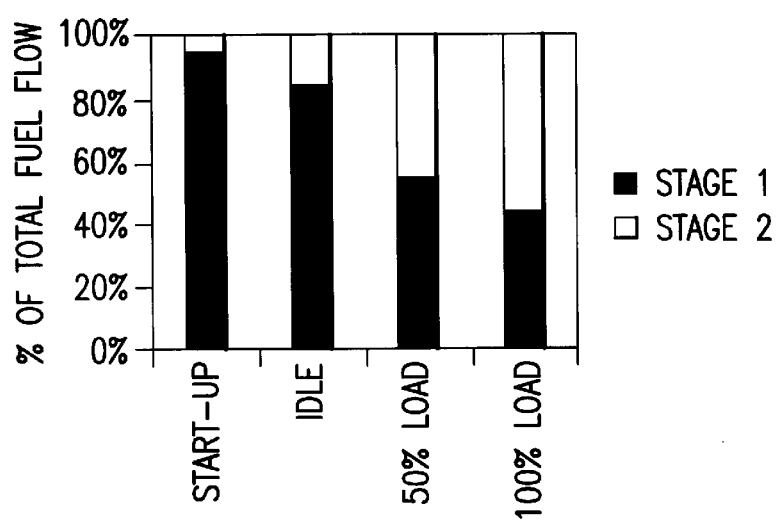
FIG. 4 shows an example of the type of operation for both stages of the present burner system dependent on the operating load.

In this way, a gas turbine can be operated from ignition to basic load without a separate pilot stage and only a single control valve. FIG. 4 hereby shows an example of an operation for the case with two stages with a stage ratio of 50% in the burner system. The control valve hereby controls only the distribution of the entire supplied fuel flow to both stages. While the fuel is almost exclusively supplied to the first stage during ignition or start-up of the burner system or gas turbine, this ratio changes by increasing during idling, at 50% load, and 100% load. At 100% load, the second stage is then supplied with somewhat more fuel than the first stage. Such an operating concept makes it possible to realize a stable operation of the burner system without an additional requirement of a pilot stage. Naturally, the fuel distribution shown here will be shifted by the control device during the operation of the system in relationship to environmental conditions and aging.

LIST OF REFERENCE NUMBERS

| | |
|---|---|
| 1 | Swirl body |
| 2 | Outlet openings |
| 3 | Pilot lance |
| 4a | Fuel supply means of first stage |
| 4b | Fuel supply means of second stage |
| 5 | Combustion chamber |
| 6a | Fuel distribution system of first stage |
| 6b | Fuel distribution system of second stage |
| 7a | Control valve of first stage |
| 7b | Control valve of second stage |
| 8 | Pulsation sensor |
| 9 | Emission sensor |
| 10 | Control device |

What is claimed is:

1. A burner system with staged fuel injection, comprising:
   a burner having a swirl generator for a combustion air stream and means for introducing fuel into the combustion air stream, the means for introducing fuel into the combustion air stream comprising at least one first fuel supply means with a first group of fuel outlet openings for a first premix fuel amount and a second fuel supply means with a second group of fuel outlet openings downstream from the first group of fuel outlet openings for a second premix fuel amount;
   at least one probe selected from the group consisting of a first measuring value probe that measures combustion pulsations initiated by the burner, a second measuring value probe that measures emission values, and both and
   a control device connected to the at least one probe to receive the measuring data from the at least one probe, and connected to the first and second fuel supply means to control the fuel supply based on the measuring data provided by the at least one probe.

2. A burner system as claimed in claim 1, wherein the control device comprises control data stored in a memory and logic for comparing the data provided by the at least one probe with the control data, the logic providing control signals for controlling the fuel supply via the first and second fuel supply means.

3. A burner system as claimed in claim 1, further comprising:
   at least one control valve;
   a supply line for each of the first and second fuel supply means, the at least one control valve regulating the fuel supply through the supply lines.

4. A burner system as claimed in claim 3, wherein the at least one control valve is in communication with and controlled by the control device.

5. A burner system as claimed in claim 3 wherein the supply line for the second fuel supply means branches off the supply line for the first fuel supply means.

6. A burner system as claimed in claim 5, wherein the at least one control valve comprises a control valve controlled by the control device for distributing the fuel amount between the supply lines.

7. A burner system as claimed in claim 1, wherein the burner has a burner axis, and the first and second group of fuel outlet openings on the swirl generator are arranged in the direction of the burner axis.

8. A method for operating a burner with staged fuel injection, the burner being provided with at least one first stage and one second stage arranged downstream from the first stage for the introduction of fuel into a combustion air stream, comprising the steps of:
   measuring at least one value selected from the group consisting of pulsations of combustion initiated by the burner, emission values of the combustion, and both; and
   controlling the fuel supply to the first and second stage based on the value measured in the measuring step.

9. A method as claimed in claim 8, wherein the step of controlling the fuel supply comprises controlling the fuel supply to the first and second stage to minimize the pulsation values, the emission values, or both.

10. A method as claimed in claim 8, wherein the step of controlling comprises controlling the fuel supply with control valves provided in the supply lines for the first stage and the second stage.

11. A method as claimed in claim 8, wherein the step of controlling comprises controlling the fuel supply with a control valve that controls the division of the fuel between the supply lines of the first and second stages.

12. A method as claimed in claim 8, wherein the step of controlling comprises comparing the at least one value to predetermined control data which shows a dependence of the pulsations, the emission values, or both, on the fuel supply to the first and second stage.

13. A method as claimed in claim 12, wherein the step of controlling comprises controlling the fuel supply during stationary operation so that the operating point is below the maximum of the pulsations.

14. A method as claimed in claim 11, wherein the step of controlling comprises controlling the fuel supply during transient operation so that the operating point is above the maximum of the pulsations.

* * * * *